United States Patent [19]

Tokuda et al.

[11] Patent Number: 4,618,181
[45] Date of Patent: Oct. 21, 1986

[54] AUTOMOBILE ROOF STRUCTURE

[75] Inventors: Makoto Tokuda, Hiroshima; Takami Kimoto, Kure, both of Japan

[73] Assignee: Mazda Motor Corporation, Hiroshima, Japan

[21] Appl. No.: 709,229

[22] Filed: Mar. 7, 1985

[30] Foreign Application Priority Data

Mar. 15, 1984 [JP] Japan .............. 59-37340[U]

[51] Int. Cl.⁴ .............. B62D 27/02; B62D 25/07; B23K 11/10
[52] U.S. Cl. .............. 296/191; 296/208; 296/29; 296/210; 296/213; 228/182; 228/173.6; 219/91.2; 52/792
[58] Field of Search .............. 296/29, 187, 191, 208, 296/210, 213; 228/173.3, 173.6, 182, 189; 219/91.2, 91.23, 117.1; 52/792, 814

[56] References Cited

U.S. PATENT DOCUMENTS

| | | |
|---|---|---|
| 1,895,133 | 1/1933 | Quarnstrom .............. 228/173.3 |
| 2,008,640 | 7/1935 | Fraser .............. 52/814 |
| 2,384,965 | 9/1945 | Reid .............. 296/29 |
| 3,112,952 | 12/1963 | Barenyi .............. 296/210 |
| 3,124,224 | 3/1964 | Paul et al. .............. 296/29 |
| 3,696,578 | 10/1972 | Swenson et al. .............. 52/792 |
| 3,711,147 | 1/1973 | Higuchi et al. .............. 296/208 |
| 4,417,762 | 11/1983 | Imai et al. .............. 296/210 |
| 4,444,428 | 4/1984 | Iwakura et al. .............. 296/213 |

Primary Examiner—Robert B. Reeves
Assistant Examiner—Dennis H. Pedder
Attorney, Agent, or Firm—Fleit, Jacobson, Cohn & Price

[57] ABSTRACT

An automobile roof panel structure including a central main roof panel and a pair of auxiliary roof panel assemblies attached to the opposite longitudinal side edges of the main roof panel. Each auxiliary roof panel assembly includes an outer panel and an inner panel which are welded together at connecting flanges thereof to form a structure of closed cross-section. The main roof panel has side edge portions which are laid on the connecting flanges of the auxiliary roof panel assemblies. The side edge portions of the main roof panel are formed with a plurality of longitudinally spaced upward projections separated by intermediate planar portions. The planar portions are laid directly on the connecting flange of the outer panel of the auxiliary roof panel. The connecting flanges on the outer and inner panels of the auxiliary roof panel assembly are first welded together by spot welding at portions corresponding to the projections in the side edge portions of the main roof panel. The side edge portions of the main roof panel are subsequently welded to the connecting flanges of the auxiliary roof panel assembly at the intermediate planar portions.

6 Claims, 3 Drawing Figures

AUTOMOBILE ROOF STRUCTURE

BACKGROUND OF THE INVENTION

1. Field of the Invention

The present invention relates to roof structures for automobile bodies.

2. Description of Prior Art

Conventionally, an automobile roof structure includes a pair of side rails of a closed cross-section extending longitudinally along the opposite sides of the roof and a roof panel extending between and welded to the side rails. The roof panel has opposite side portions which are laid over the respective side rails to be welded thereto. This type of roof structure has been found disadvantageous in respect of weight since substantial widths of the roof panel side portions are laid over the side rails. In order to overcome the above disadvantage, the U.S. Pat. No. 3,711,147 to S. Higuchi et al discloses an automobile roof structure which uses side rails as auxiliary roof panels. More specifically, each auxiliary roof panel comprises an outer panel and an inner panel respectively having transverse inner and outer flanges. The inner flanges of the outer and inner panels are welded together, and the outer flanges of the outer and inner panels are welded together to form a structure of a closed cross-section. The main roof panel has opposite side edge portions, each of which is welded to the inner flanges of each auxiliary roof panel. A groove is formed between the main roof panel and the auxiliary roof panel at the junction therebetween and a trim strip is placed in the groove.

It has been found, however, that in this proposed roof structure there is a problem of welding reliability between the main and auxiliary roof panels. In fact, when the inner flanges of the auxiliary roof panel are welded together, there are produced irregularities on the flange surfaces due to welded traces so that the side portion of the main roof panel is prevented from coming into intimate contact with the inner flange on the auxiliary roof panel. This will cause a loss in weld strength and warps in the panels.

In order to eliminate the above problems, the inner flanges of the auxiliary roof panel may be extended laterally inwardly so that the welding portions between the inner flanges of are not overlapped with the welded portions between the main roof panel and the auxiliary roof panel. However, this solution is not recommendable because such extension of the flanges of the auxiliary roof panel causes an increase in weight.

OBJECT OF THE INVENTION

It is an object of the present invention to provide an automobile roof structure in which weight can be decreased without increasing manufacturing cost.

Another object of the present invention is to provide an automobile roof structure in which welding deformations can be eliminated with a simple structural arrangement.

SUMMARY OF THE INVENTION

According to the present invention, the above and other objects can be eliminated by an automobile roof structure comprising a main roof panel having opposite side edge portions, a pair of auxiliary roof panel assemblies extending along each of the side edge portions of the main roof panel, each of said auxiliary roof panel assemblies including an outer panel having a laterally inner flange and a laterally outer flange and an inner panel having a laterally inner flange and a laterally outer flange, the outer panel being welded at the inner and outer flanges with the inner and outer flanges, respectively, of said inner panel to form a structure of a closed cross-section, said main roof panel being formed at each side edge portion with a plurality of projections spaced apart from each other along a length of the side edge portion and projecting outwardly of the side edge portion, said inner flanges of the outer and inner panels of the auxiliary roof panel assembly being welded together at portions where the projections of the main roof panel are located, said side edge portion of the main roof panel being welded to the inner flange of the outer panel of the auxiliary roof panel assemblies at portions between said projections of the main roof panel.

In a preferable aspect of the present invention, the side edge portion of the main roof panel is defined by a stepped down portion to form a groove at a junction between the main roof panel and the auxiliary roof panel, trim means being provided in said groove and attached to the projections on the main roof panel. The outer panel of the auxiliary roof panel assembly may have a longitudinally extending portion which projects upwards beyond a top surface of the trim means to define a rain rail.

According to the features of the present invention, the side edge portion of the main roof panel is not laid directly on the welding traces between the inner flanges of the outer and inner panels of the auxiliary roof assemblies. Therefore, the welding traces do not cause any distortion in the main roof panel. It is unnecessary to provide a laterally inward extension in the auxiliary roof panel assembly, so there will be no weight increase in the structure of the present invention.

DESCRIPTION OF THE PREFERRED EMBODIMENT

Figure 1:
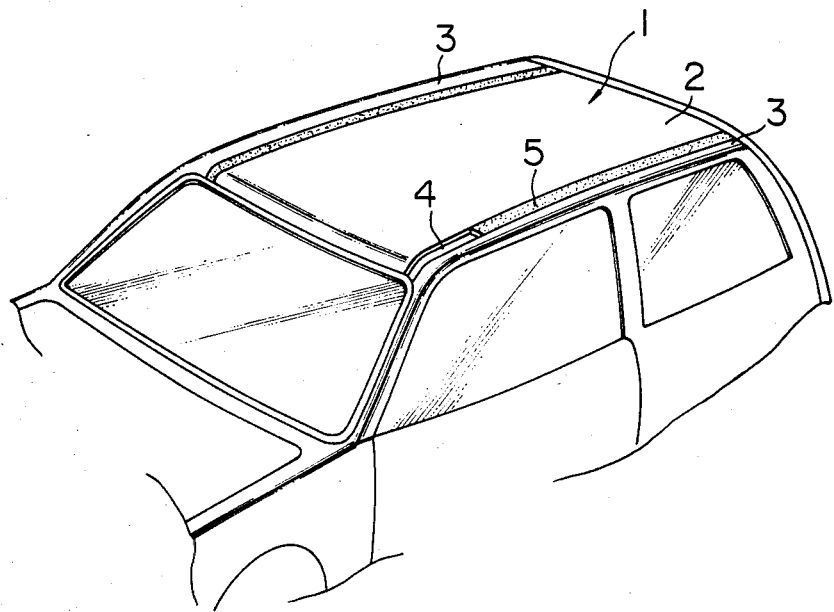
FIG. 1 is a fragmentary perspective view of an automobile body in accordance with one embodiment of the present invention.
Figure 2:
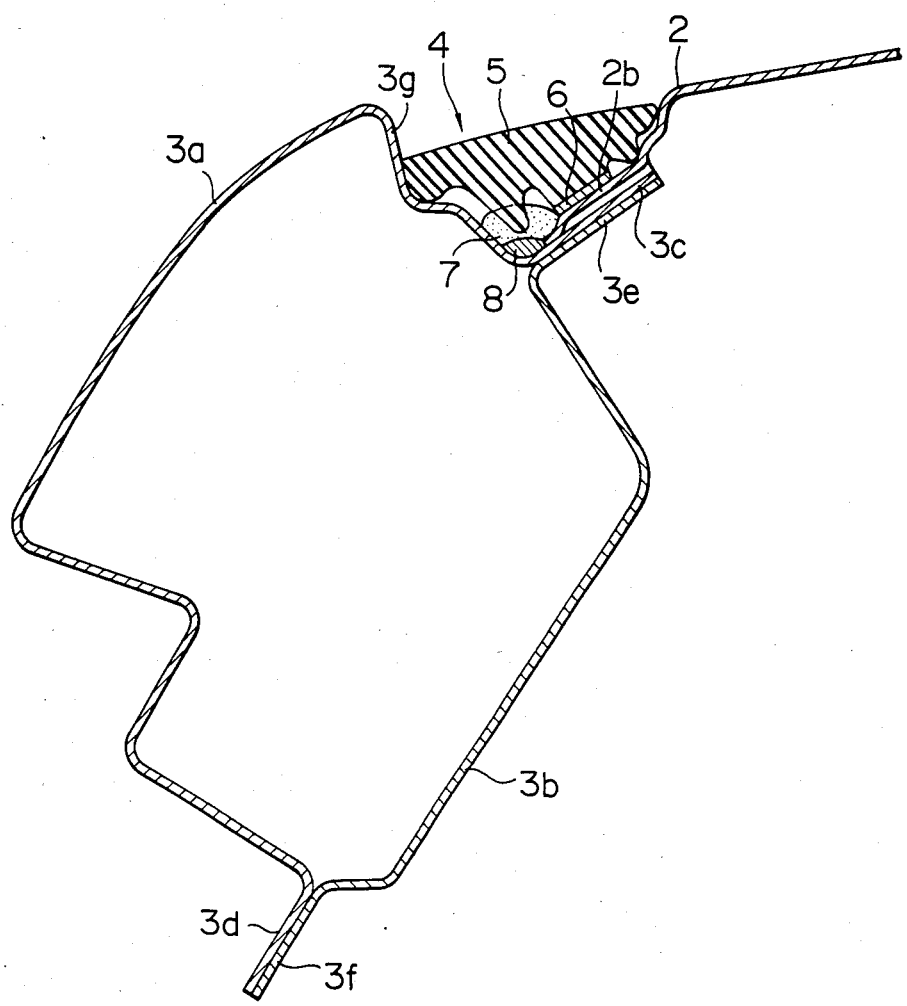
FIG. 2 is a fragmentary sectional view of a junction in the roof structure; and, FIG. 3 is a fragmentary perspective view of the junction in the roof structure.

Referring to the drawings, and particularly to FIG. 1, there is shown an automobile body having a roof structure 1 which comprises a central main roof panel 2 and a pair of auxiliary roof panel assemblies 3 extending along the longitudinal opposite side edges of the main roof panel 1. At the junction between the main roof panel 2 and each auxiliary roof panel assembly 3, there is formed a groove 4 in which a trim member 5 is disposed. Referring to FIG. 2, it will be noted that the auxiliary roof panel assembly 3 includes an outer panel 3a and an inner panel 3b which is located below and laterally inside with respect to the outer panel 3a. The outer panel 3a has a laterally inward flange 3c and a laterally outward flange 3d, whereas the inner panel 3b has a laterally inward flange 3e and a laterally outward flange 3f. The flanges 3c and 3d on the outer panel 3a are welded respectively to the flanges 3e and 3f on the inner panel 3b to form a structure of a closed cross-section. As clearly shown in FIG. 2, the flange 3c of the outer panel 3a is inclined relative to the horizontal to define a longitudinally extending recess with vertical wall 3g and so that the flanges 3c and 3e are located vertically downward with respect to the uppermost surface of the auxiliary roof assembly 3, which is defined by the outer surface of the outer panel 3a.

Figure 3:
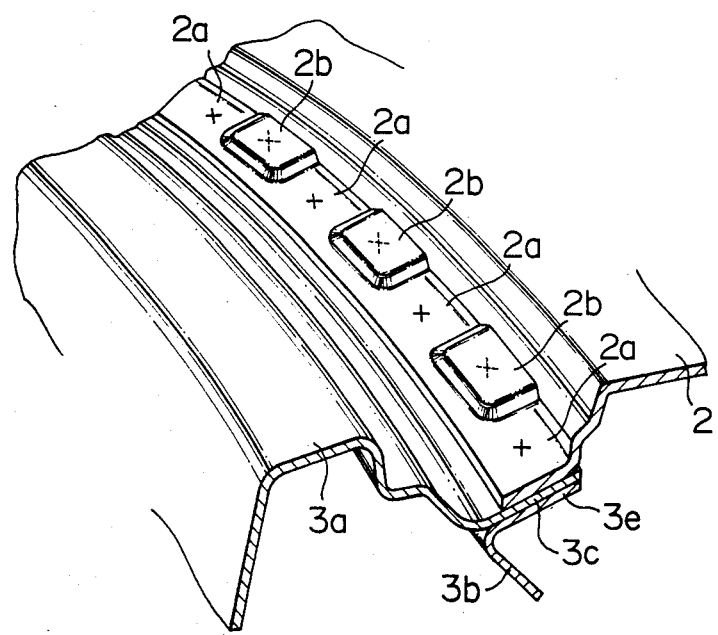

The main roof panel 2 has opposite, longitudinally extending side edge portions that are recessed below the surface of the center portion thereof to define a stepped down portion, each side edge portion being in the form of a flange which is adapted to be laid on the flange 3c on the outer panel 3a. In each side edge portion of the main roof panel 2, there are formed a plurality of planar portions 2a which are spaced apart longitudinally from each other, and upward projections 2b formed between respective adjacent pairs of the planar portions 2a. The main roof panel 2 is placed on the auxiliary roof panel assemblies 3 with the planar portions 2a laid directly on the flange 3c of the outer panel 3a. The flanges 3c and 3e of the auxiliary roof panel assembly 3 have previously been welded together by spot welding at portions corresponding to the upward projections 2b of the main roof panel 2, as shown by the phantom X's in FIG. 3. It will therefore be understood that the planar portions 2a of the main roof panel 2 can be laid on the flange 3c without interference by traces of the weld between the flanges 3c and 3e. The planar portions 2a of the main roof panel 2 are then welded to the previously joined flanges 3c and 3e by spot welding. It is therefore possible to weld the main roof panel 2 to the auxiliary roof panel assembly 3 without the main roof panel being deformed thereby.

As previously described, the groove 4 is defined at the junction between the main roof panel 2 and the auxiliary roof panel assembly 3. In the groove 4, a sealing compound 8 is applied between the side edge of the main roof panel 2 and the recess adjacent flange 3c of the outer panel 3a for the purpose of providing weather-tightness. Further, the groove 4 is filled with a trim member 5 as previously described. The trim member 5 is adhesively attached to the main roof panel 2 at the projections 2b through an adhesive tape 6. As shown in FIG. 2, the side edge portion of the main roof panel 2 and the flanges 3c and 3e of the auxiliary roof panel 3 are inclined downwardly and outwardly relative to roof panel 2 to provide a substantially V-shaped longitudinal recess at the bottom of groove 4. Where the trim member 5 cannot completely fill the bottom portion of the groove 4, it is preferable to provide a filled member 7 which may be formed of a foamed plastic material such as polyurethane. The vertical wall 3g of the outer panel 3c extends longitudinally and upwards beyond the upper surface of the trim member 5 so as to provide a rain rail.

The invention has thus been shown and described with reference to a specific embodiment. However, it should be noted that the invention is in no way limited to the details of the illustrated structures, but changes and modifications may be made without departing from the scope of the appended claims.

We claim:

1. An automobile roof structure comprising a main roof panel having opposite side edge portions, a pair of auxiliary roof panel assemblies, each of the auxiliary roof panel assemblies extending along a side edge portion of the main roof panel, each side edge portion of the main roof panel being defined by a stepped down portion to form a groove at a junction between the main roof panel and an auxiliary roof panel, each of said auxiliary roof panel assemblies including an outer panel having a laterally inner flange and a laterally outer flange and an inner panel having a laterally inner flange and a laterally outer flange, the inner and outer flanges of said outer panel being welded to the inner and outer flanges, respectively, of said inner panel to form a structure of a closed cross-section, said main roof panel stepped down portions including a plurality of projections spaced apart from each other along a length of the side edge portion, said inner flanges of the outer and inner panels of the auxiliary roof panel assembly being welded together at portions where the projections of the main roof panel are located, said projections overlying and enclosing within the groove the inner flange weld portions, said side portion of the main roof panel being welded to the inner flange of the outer panel of the auxiliary roof panel assemblies at portions between said projections of the main roof panel.

2. An automobile roof structure in accordance with claim 1 in which trim means is provided in said groove.

3. An automobile roof structure in accordance with claim 2 in which said trim means is attached to the projections on the main roof panel.

4. An automobile roof structure in accordance with claim 2 in which said outer panel of the auxiliary roof panel has a longitudinally extending portion which projects upwards beyond a top surface of the trim means to define a rain rail.

5. An automobile roof structure in accordance with claim 1 in which said side edge portion of the main roof panel and said inner flanges of the outer and inner panels of the auxiliary roof panel assembly are inclined downwardly toward laterally outward.

6. An automobile roof structure in accordance with claim 5 in which said outer panel of the auxiliary roof panel has a longitudinally extending portion which projects upwards beyond a top surface of the trim means to define a rain rail.

* * * * *